Figure 1:
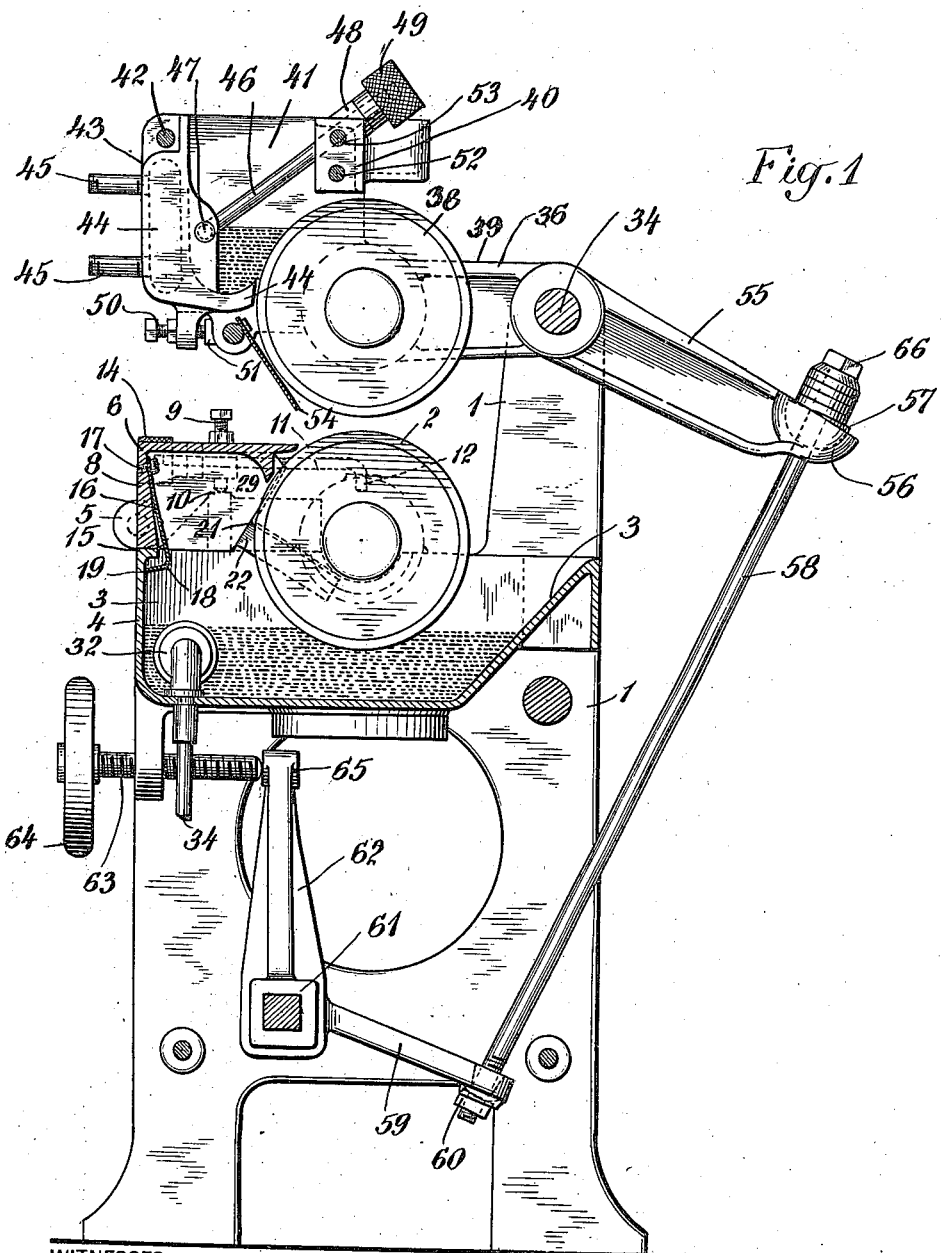

J. B. HABERLE & J. B. B. STRYKER.
GLUE SPREADING MACHINE.
APPLICATION FILED NOV. 7, 1911.

1,143,385.

Patented June 15, 1915.
3 SHEETS—SHEET 1.

WITNESSES:
George Schlatt
John O. Templer

INVENTORS
John B. Haberle
Julius B. B. Stryker
BY
Kenyon & Kenyon
ATTORNEYS

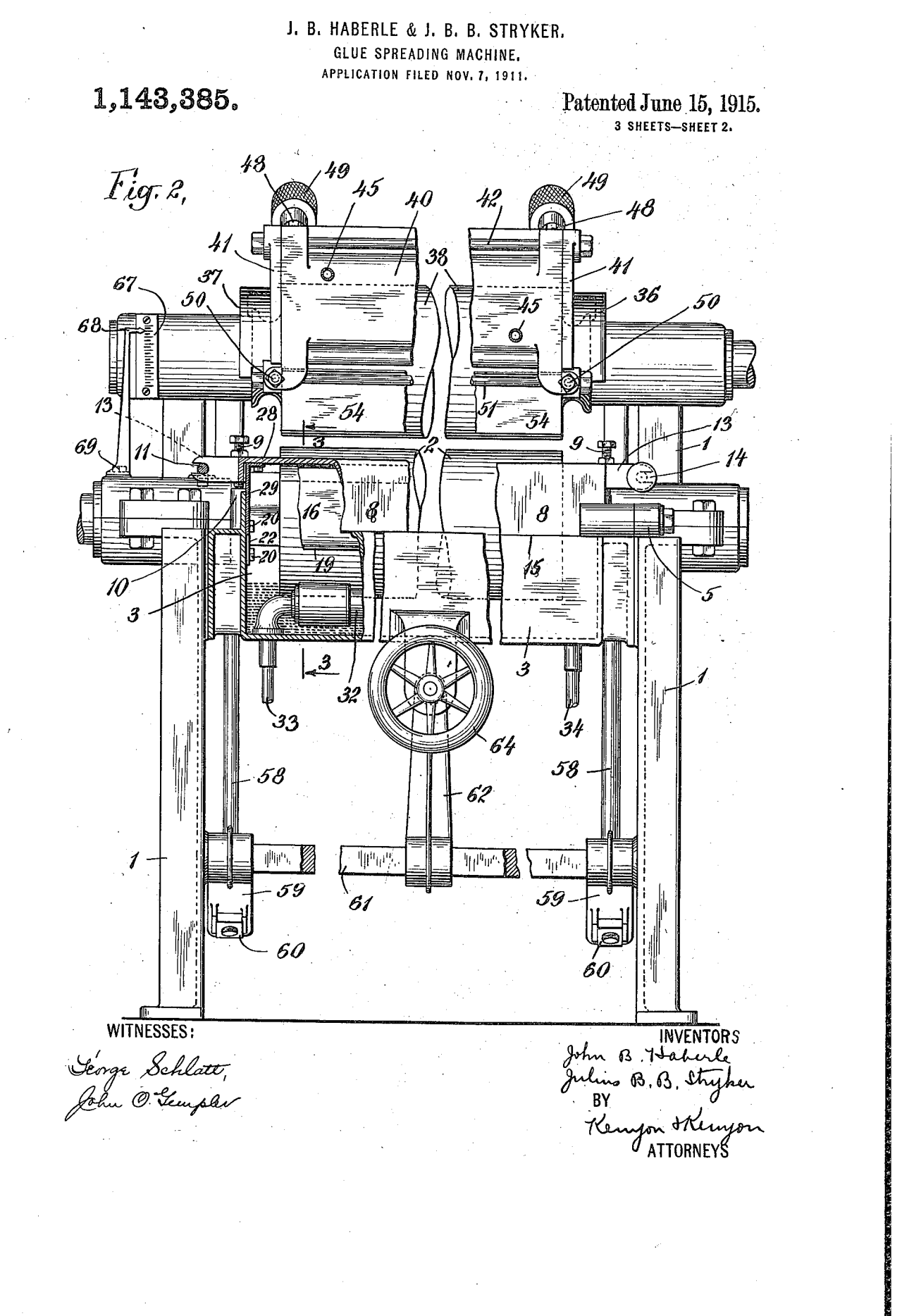

J. B. HABERLE & J. B. B. STRYKER.
GLUE SPREADING MACHINE.
APPLICATION FILED NOV. 7, 1911.

1,143,385.

Patented June 15, 1915.

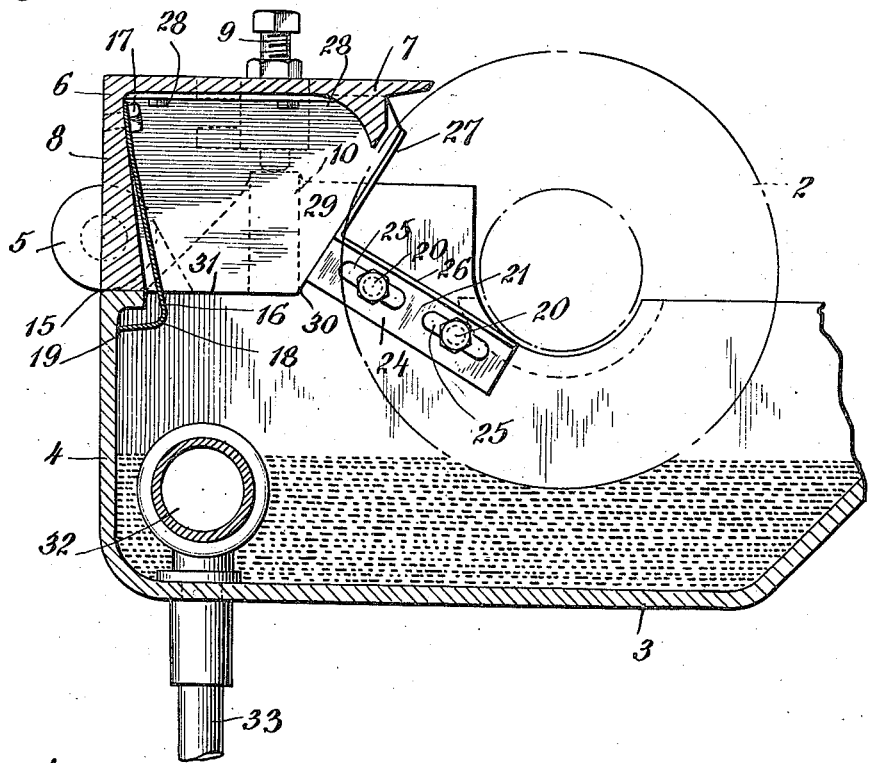
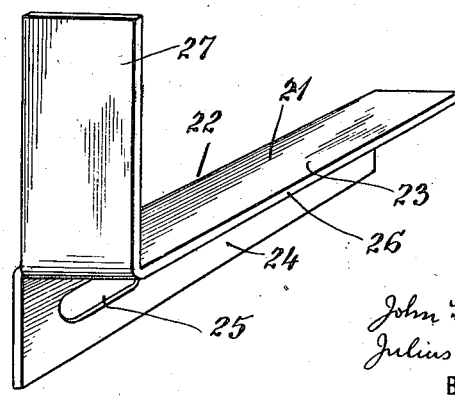

UNITED STATES PATENT OFFICE.

JOHN B. HABERLE, OF SOUTH BEND, INDIANA, AND JULIUS B. B. STRYKER, OF LANSDALE, PENNSYLVANIA, ASSIGNORS TO PERKINS GLUE COMPANY, A CORPORATION OF PENNSYLVANIA.

GLUE-SPREADING MACHINE.

1,143,385.  Specification of Letters Patent.  Patented June 15, 1915.

Application filed November 7, 1911. Serial No. 659,070.

*To all whom it may concern:*

Be it known that we, JOHN B. HABERLE and JULIUS B. B. STRYKER, citizens of the United States, the former a resident of South Bend, county of St. Joseph, State of Indiana, and the latter a resident of Lansdale, county of Montgomery, State of Pennsylvania, have invented certain new and useful Improvements in Glue-Spreading Machines, of which the following is a specification.

Our invention relates to improvements in glue spreading machines and the like, and is especially directed to improvements in a machine such as shown in application, Serial No. 614,038, filed March 13th, 1911.

One object of the invention is to provide a more efficient and simple means for adjusting the space between the glue rolls.

A further object is to provide improved means for scraping the ends of the glue rolls and for closing the ends of the glue troughs.

Further objects, features and advantages will more clearly appear from the detailed description given below, taken in connection with the accompanying drawings which form a part of this specification.

In the drawings, Figure 1 is a transverse section through a machine embodying the improvements in one form. Fig. 2 is a front elevation of such a machine, certain parts being broken away in order to more clearly illustrate the same. Fig. 3 is a detailed transverse section taken on the line 3—3 of Fig. 2. Fig. 4 is a perspective of one of the scrapers applied to the end of the glue roll.

Referring to the drawings, 1 represents a suitable frame in which is journaled a lower glue roll 2.

Situated below the glue roll 2, and into which the glue roll 2 dips, is a glue applying trough 3 provided with a perpendicular wall 4 on one side thereof. The glue trough 3 as so far described is rigid with the frame 1.

Pivoted by means of bearings 5 is a member 6 carrying a scraper 7, the scraper 7 having integral therewith a wall 8 which forms an extension of the wall 4, for the glue trough 3. The scraper 7 may be adjusted with respect to the surface of the glue roll 2 by means of set screws 9 passing through the scraper, and coöperating with bosses 10 rigid with the main frame.

For holding the scraper in place toward the glue roll 2, arms 11 are provided, one at either end, and pivoted or journaled at 12 in the bearings of the glue roll 2. These arms 11 are arranged to engage forked members 13, rigid with the rear wall 8, and extending from the ends thereof, and on the outer end of the arms 11 are screwed knurled hand nuts 14. By screwing up the hand nuts 14 the scraper 7 may be forced into place, and the position finally occupied by the scraper 7 will depend upon the adjustment of the screws 9.

When it is desired to clean out the glue trough 3 the hand nuts 14 are slightly unscrewed, whereupon the arms 11 may be thrown outwardly to one side out of the forks 13, when the scraper 7 with its back wall 8 may be oscillated backwardly about the pivoting means 5, so that ready access may be had into the front portion of the trough 3. It will therefore be seen that a joint is formed at 15, in the back wall 4, 8, of the glue trough, and that in the ordinary operation of the machine glue would be apt to work out through this joint. In order to prevent this there is provided a metallic member 16, rigidly secured to the back portion 8, by means of screws 17, and bent at 18, so as to form an edge 19, which resiliently engages the inner side of the back wall 4 when the scraper is in place in normal operation. It will be seen that when the scraper is thrown into position for normal operation the member 16 extends over the joint 15 on the inside of the trough, and will resiliently engage the back wall 4.

Adjustably secured to the rear walls of the trough 3 by means of screws 20, are scrapers 21. The scrapers 21 are bent substantially at right angles at 22, to form scraper faces 23 and faces 24, in which are slots 25, through which the screws 20 pass.

The edge 26 of the face 21 engages the end of the roll in order to scrape any glue therefrom. The members 22 are provided with integral upturned extensions 27, which lie close to the end of the roll 2 and near its periphery, as clearly shown in Figs. 1 and 3. Secured to the ends of the scraper 7 by screws 28, are end plates 29 which are adapted to close the end of the glue trough 3 at this point. The plates 29 have an edge 30, which when the scraper 7 is forced into operative position, practically engages the face of the upturned extension 27, while the edge 31 of the plate 29 lies at or below the top of the end of the glue trough 3.

By the parts above described, the glue trough on the side of the glue roll is thoroughly closed up so as to prevent any glue from working out, and yet the parts are simple and easy of construction, and easily put into place and adjusted.

At 32 is shown a pipe lying in the glue trough 3, and adapted to be fed with steam from the outside by means of pipes 33 and 34. The steam provides heat if desired for the purpose of warming the glue in the glue trough 3.

Pivotally mounted as at 35 are two lever arms 36 and 37. Journaled in the inner ends 39 of these lever arms is an upper roll 38. The inner ends of these lever arms carry also a glue trough 40 provided with ends 41, to which is pivotally mounted by means of shaft 42 a front wall 43, carrying a scraper 44 for scraping the upper glue roll 38. The front wall 43 is hollow, as at 44, and steam is admitted thereto by pipes 45 for the purpose of supplying heat to heat the glue in the trough 40.

46 represents rods pivoted to the wall 43 at 47, and the rods 46 are adapted to engage forked members at 48, and have screw threaded on their outer ends knurled hand nuts 49. The wall 43 has screw threaded therein adjusting screws 50 which coöperate with bosses 51 to adjust the distance between the scraping edge of scraper 44 and the face of the roll 38.

Tie rods 52 and 53 serve to rigidly hold the ends 41 in position. Rigidly secured to the tie rod 51 is a plate 54 extending substantially the whole length of the roll, as shown in Figs. 1 and 2, which plate acts as a guard to the hands of the operator to prevent them from coming in touch with the roll 38, and being dragged between the two glue rolls.

The outer ends 55 of the lever arms 36 are provided with cup shaped depressions, as at 56, which are engaged by semi-spherical heads 57, secured upon connecting rods 58. Each of the two connecting rods 58 passes through an opening in an arm 59, and is secured thereto by means of nut 60. The arms 59 are rigidly secured to a rock shaft 61, suitably journaled in the frame of the machine. Also rigidly secured to the rock shaft 61 is a third arm 62, which extends upwardly therefrom, as clearly shown in Figs. 1 and 2. Screw threaded in the frame of the machine is screw 63 having rigid therewith at its outer end a hand wheel 64. The inner end of the screw 63 engages a head 65 integral with the end of the arm 62. It will therefore be seen that by turning the hand wheel 64 the shaft 61 will be oscillated, thereby rocking the arms 59 and communicating movement through the rods 58 to both of the lever arms 36 and 37 simultaneously, so that both ends of the roll 38 are moved simultaneously and to the same extent. Adjustment of one end of the roll 38 without the other may be had by means of nuts 66 upon the upper ends of the connecting rods 58. It will therefore be seen that especially simple and efficient means are provided for moving the upper roll 38 and adjusting it with respect to the lower roll, in which only one hand wheel is needed in order to adjust both ends of the upper roll simultaneously.

Carried rigidly upon the bearing of the upper roll 38 is a scale 67, which may be marked off in inches or any other suitable units.

Coöperating with the scale 67 is a pointer 68 rigidly secured to the bearing of the lower roll, as at 69. It will thus be seen that the scale 67 and the pointer 68 coöperate to indicate the distance between the two glue applying rolls 2 and 38, whereby they may be readily and quickly adjusted by the operator to accommodate the particular thickness of material to be operated upon.

Although we have described our improvements in great detail and with respect to one particular embodiment thereof, nevertheless we do not desire to be limited to such details except as clearly specified in the appended claims, since many changes and modifications may well be made without departing from the spirit and scope of our invention in its broadest aspects.

Having thus fully and clearly described our improvements, what we claim as new and desire to secure by Letters Patent, is:

1. The combination of upper and lower rolls, a trough for applying glue to the lower roll, a scraper for the lower roll pivotally mounted on said trough, the back portion of said scraper forming part of the wall of said trough, whereby a joint is formed in said wall, and a member extending over said joint and on the inside of said trough to keep the glue from working out at the joint, said member comprising a sheet of metal secured to the back portion of the scraper and having an edge which resiliently engages the wall of the trough below the joint when the scraper is in operative position.

2. The combination of upper and lower rolls, a glue trough for applying glue to one of said rolls, one upright wall of said trough being divided into two parts, one movably mounted with respect to the other, whereby a joint is formed in said wall, and resilient means extending over said joint on the inside of the trough to keep the glue from working into or out at the joint.

3. The combination of upper and lower rolls, a glue trough for applying glue to one of said rolls, one upright wall of said trough being divided into two parts, one pivotally mounted with respect to the other, whereby a joint is formed in said wall, and means extending over said joint to keep the glue from working into or out at the joint, said means comprising a sheet of metal secured to one of the parts and having an edge for resiliently engaging the other of said parts.

4. The combination of upper and lower rolls, a glue trough for applying glue to one of said rolls, one wall of said trough being divided into two parts, one pivotally mounted with respect to the other, whereby a joint is formed in said wall, and means extending over said joint on the inside of the trough to keep the glue from working out at the joint, said means comprising a sheet of metal rigidly secured to the upper of said parts, and bent so as to have an edge which resiliently engages the other of said parts below the joint, when the parts are in normal position.

5. The combination of upper and lower rolls, a trough for applying glue to the lower roll, a scraper for the lower roll movably mounted on said trough, the back portion of said scraper forming part of the wall of said trough, whereby a joint is formed in said wall, and a member extending over said joint and on the inside of said trough to keep the glue from working out at the joint, said member comprising a sheet of metal secured to the back portion of the scraper and having an edge which resiliently engages the wall of the trough below the joint when the scraper is in operative position, and scrapers for scraping the ends of the lower roll.

6. The combination of upper and lower rolls, a trough for applying glue to the lower roll, a scraper for the lower roll pivotally mounted on said trough, the back portion of said scraper forming part of the wall of said trough, whereby a joint is formed in said wall, and a member extending over said joint and on the inside of said trough to keep the glue from working out at the joint, said member comprising a sheet of metal secured to the back portion of the scraper and having an edge which resiliently engages the wall of the trough below the joint when the scraper is in operative position, and scrapers for scraping the ends of the lower roll, said last mentioned scrapers comprising sheets of metal bent at right angles, one edge of each engaging the end of the roll, one face of each being adjustably secured with respect to the roll.

7. The combination of upper and lower rolls, a trough for applying glue to the lower roll, a scraper for the lower roll pivotally mounted on said trough, the back portion of said scraper forming part of the wall of said trough, whereby a joint is formed in said wall, and a member extending over said joint and on the inside of said trough to keep the glue from working out at the joint, said member comprising a sheet of metal secured to the back portion of the scraper and having an edge which resiliently engages the wall of the trough below the joint when the scraper is in operative position, and scrapers for scraping the ends of the lower roll, said last mentioned scrapers comprising sheets of metal bent at right angles, one edge of each engaging the end of the roll, one face of each being adjustably secured with respect to the roll, and each of said last mentioned scrapers having an upturned extension, and plates secured to the ends of said first mentioned scraper, which substantially engage said upturned extension to properly close up the end of the glue trough.

8. The combination of upper and lower rolls, a trough for applying glue to the lower roll, a scraper for the lower roll, scrapers for scraping the ends of the lower roll, said last mentioned scrapers comprising sheets of metal bent at right angles, one edge of each engaging the end of the roll, one face of each being adjustably secured with respect to the roll, and each of said last mentioned scrapers having an upturned extension, and plates secured to the ends of said first mentioned scraper, which substantially engage said upturned extensions to properly close up the end of the glue trough.

9. The combination of upper and lower rolls, a trough for applying glue to the lower roll, a scraper for the lower roll, and scrapers for scraping the end faces of the lower roll, said last mentioned scrapers comprising sheets of metal bent so as to form two plain parts parallel to the axis of the roll, but at right angles to one another, one edge of each part engaging the end of the roll, and each scraper being adjustably secured with respect to the roll.

10. The combination of upper and lower rolls, a trough for applying glue to the lower roll, a scraper for the lower roll, scrapers for scraping the ends of the lower roll, said last mentioned scrapers comprising sheets of metal, one edge of each engaging the end of the roll and each of said last mentioned scrapers having an upturned extension, and plates secured to the ends of said first mentioned scraper, which substantially engage said upturned extensions to properly close up the end of the glue trough.

In testimony whereof, we have signed our names to this specification in the presence of two subscribing witnesses.

JOHN B. HABERLE.

Witnesses to the signature of John B. Haberle:
 HARRY R. WARR,
 ELLA C. BAUSTIAN.

JULIUS B. B. STRYKER.

Witnesses to the signature of Julius B. B. Stryker:
 A. P. PLACE,
 J. W. PLACE.